United States Patent
Hasegawa (10) Patent No.: US 12,384,220 B2
(45) Date of Patent: Aug. 12, 2025

(54) FLUID PRESSURE SHOCK ABSORBER (71) Applicant: KYB Corporation, Tokyo (JP)

(72) Inventor: Kazuki Hasegawa, Gifu (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 18/844,332

(22) PCT Filed: Mar. 1, 2023

(86) PCT No.: PCT/JP2023/007662
§ 371 (c)(1),
(2) Date: Sep. 5, 2024

(87) PCT Pub. No.: WO2023/171508
PCT Pub. Date: Sep. 14, 2023

(65) Prior Publication Data
US 2025/0178398 A1 Jun. 5, 2025

(30) Foreign Application Priority Data

Mar. 8, 2022 (JP) .................. 2022-035295

(51) Int. Cl.
B60G 13/08 (2006.01)
B60G 17/08 (2006.01)

(52) U.S. Cl.
CPC ............ *B60G 17/08* (2013.01); *B60G 13/08* (2013.01); *B60G 2202/24* (2013.01);
(Continued)

(58) Field of Classification Search
CPC .... B60G 13/08; B60G 17/08; B60G 2202/24; B60G 2202/41; B60G 2202/415;
(Continued)

(56) References Cited

U.S. PATENT DOCUMENTS 6,332,622 B1 * 12/2001 Nakamura .............. F16F 9/464
188/266.5
6,981,577 B2 * 1/2006 Katayama ............... F16F 9/537
188/267.2

(Continued)

FOREIGN PATENT DOCUMENTS

CN 104094013 A * 10/2014 ............. B60G 17/00
CN 108027005 A * 5/2018 ............. F16F 9/062

(Continued)

*Primary Examiner* — Jason D Shanske
*Assistant Examiner* — Daniel M. Keck
(74) *Attorney, Agent, or Firm* — Rabin & Berdo, P.C.

(57) ABSTRACT

A fluid pressure shock absorber includes a damping valve that is capable of changing damping characteristic in response to a pilot pressure, and a pilot valve configured to supply the working fluid in the bottom-side chamber or the rod-side chamber to a pilot chamber of the damping valve as a pilot pressure. The pilot valve has a first pilot chamber configured such that the working fluid is guided from the bottom-side chamber, and a second pilot chamber configured such that the working fluid is guided from the rod-side chamber. When the fluid pressure shock absorber is not extended/contracted, the pilot valve supplies the pilot pressure to the pilot chamber of the damping valve, and when the fluid pressure shock absorber is extended/contracted, the pilot valve holds the pilot pressure in the pilot chamber of the damping valve supplied when the fluid pressure shock absorber is not extended/contracted.

7 Claims, 7 Drawing Sheets (52) U.S. Cl.
CPC .... *B60G 2202/415* (2013.01); *B60G 2204/62* (2013.01); *B60G 2206/41* (2013.01); *B60G 2500/104* (2013.01); *B60G 2500/114* (2013.01); *B60G 2600/21* (2013.01); *B60G 2800/162* (2013.01); *B60G 2800/916* (2013.01)

(58) Field of Classification Search
CPC ............ B60G 2204/62; B60G 2206/41; B60G 2500/11; B60G 2500/114; B60G 2600/21; B60G 2800/162; B60G 2800/916; B60G 2400/202; B60G 2400/206; B60G 2600/26; B60G 2600/184; B60G 2202/413; B60G 17/0195; B60G 17/056
USPC ..................................................... 280/5.515
See application file for complete search history.

(56) References Cited

U.S. PATENT DOCUMENTS

| | | | | |
|---|---|---|---|---|
| 8,776,961 | B2 * | 7/2014 | Mori | B60G 17/08 188/266.2 |
| 2012/0145496 | A1 * | 6/2012 | Goetz | F16F 9/464 251/324 |
| 2017/0016505 | A1 | 1/2017 | Funato et al. | |
| 2017/0120716 | A1 * | 5/2017 | Sakai | F16F 9/50 |
| 2017/0267052 | A1 * | 9/2017 | Zuleger | F16F 9/465 |
| 2018/0156300 | A1 * | 6/2018 | Sakai | B60G 13/08 |
| 2019/0072148 | A1 * | 3/2019 | Sakai | F16F 9/19 |
| 2020/0300383 | A1 * | 9/2020 | Doi | F16K 1/54 |
| 2020/0393015 | A1 * | 12/2020 | Kim | F16F 9/3482 |
| 2023/0032430 | A1 * | 2/2023 | Mori | F16F 9/50 |
| 2023/0101911 | A1 * | 3/2023 | Kim | F16F 9/3484 188/280 |
| 2023/0109503 | A1 * | 4/2023 | Awano | F16F 13/007 188/282.1 |
| 2023/0358291 | A1 * | 11/2023 | Kim | F16F 9/369 |
| 2024/0157752 | A1 * | 5/2024 | Hasegawa | F16F 9/063 |
| 2024/0167532 | A1 * | 5/2024 | Hasegawa | F16F 9/19 |

FOREIGN PATENT DOCUMENTS

| | | | | |
|---|---|---|---|---|
| CN | 116917642 A | * | 10/2023 | ............ F16F 9/3485 |
| DE | 102015214343 A1 | * | 2/2016 | ............ B60G 15/04 |
| JP | H09257083 A1 | * | 9/1997 | |
| JP | 10096441 A | * | 4/1998 | |
| JP | 2000225823 A | * | 8/2000 | |
| JP | 2000230596 A | * | 8/2000 | |
| JP | 2012154405 A | * | 8/2012 | ............. F16F 9/504 |
| JP | 2015-206374 A | | 11/2015 | |
| JP | 2015229416 A | * | 12/2015 | .......... B60G 17/016 |
| KR | 20210126125 A | * | 10/2021 | |
| WO | WO-2016131908 A1 | * | 8/2016 | ............. B60G 13/08 |
| WO | WO-2020137891 A1 | * | 7/2020 | ................ F16F 9/18 |
| WO | WO-2023007550 A1 | * | 2/2023 | ........... B60G 15/062 |
| WO | WO-2024181029 A1 | * | 9/2024 | |

* cited by examiner

FIG. 1

(a) WHEN HYDRAULIC SHOCK ABSORBER IS NOT EXTENDED/CONTRACTED (EMPTY STATE)

(b) WHEN HYDRAULIC SHOCK ABSORBER IS CONTRACTED (EMPTY STATE)

(c) WHEN HYDRAULIC SHOCK ABSORBER IS EXTENDED (EMPTY STATE)

FIG. 2

(a) WHEN HYDRAULIC SHOCK ABSORBER IS NOT EXTENDED/CONTRACTED (LOADED STATE)

(b) WHEN HYDRAULIC SHOCK ABSORBER IS CONTRACTED (LOADED STATE)

(c) WHEN HYDRAULIC SHOCK ABSORBER IS EXTENDED (LOADED STATE)

FLUID PRESSURE SHOCK ABSORBER

TECHNICAL FIELD

The present invention relates to a fluid pressure shock absorber.

BACKGROUND ART

With the fluid pressure shock absorber described in JP2015-206374A, a piston rod has a rod portion that extends outside a cylinder and a piston that is connected to an end portion of the rod portion and slidably moves within the cylinder to divide an interior of the cylinder into a bottom-side chamber and a rod-side chamber. The rod portion has: a rod inner space that is formed in the rod portion and communicates with the bottom-side chamber of the cylinder; a first communicating passage that connects the rod inner space and the rod-side chamber of the cylinder; and an orifice plug that is provided in the first communicating passage and generates a damping force.

SUMMARY OF INVENTION

With a vehicle having a large maximum load capacity, the overall weight of the vehicle varies greatly depending on whether the load weight is large or small. With the fluid pressure shock absorber as described in JP2015-206374A, in which the damping force is generated by the orifice plug, it is not possible to achieve an optimal damping characteristic in accordance with the size of the load weight.

In order to achieve an optimal damping characteristic in accordance with the size of the load weight, it is conceivable to configure the fluid pressure shock absorber such that the damping characteristics can be changed by a solenoid valve. However, when the solenoid valve is to be mounted, wiring and switching control are required, and so, there is a problem in terms of cost.

An object of the present invention is to achieve, at low cost, a configuration that is capable of changing damping characteristics in accordance with a load weight.

According to one aspect of the present invention, a fluid pressure shock absorber mounted on a vehicle includes: a cylinder tube; a rod inserted into the cylinder tube so as to be movable back and forth; a piston connected to the rod and dividing an interior of the cylinder tube into a bottom-side chamber and a rod-side chamber; a damping valve configured to impart resistance to a flow of working fluid between the bottom-side chamber and the rod-side chamber, the damping valve being capable of changing damping characteristic in response to a pilot pressure; and a pilot valve configured to supply the working fluid in the bottom-side chamber or the rod-side chamber to a pilot chamber of the damping valve as a pilot pressure, wherein the pilot valve has: a first pilot chamber configured such that the working fluid is guided from the bottom-side chamber; and a second pilot chamber provided so as to be opposed to the first pilot chamber, the second pilot chamber being configured such that the working fluid is guided from the rod-side chamber, when the fluid pressure shock absorber is not extended/contracted, the pilot valve supplies the pilot pressure to the pilot chamber of the damping valve, and when the fluid pressure shock absorber is extended/contracted, the pilot valve holds the pilot pressure in the pilot chamber of the damping valve supplied when the fluid pressure shock absorber is not extended/contracted.

DESCRIPTION OF EMBODIMENTS

In the following, with reference to the drawings, a fluid pressure shock absorber according to an embodiment of the present invention will be described.

In the following, a case in which the fluid pressure shock absorber is a hydraulic shock absorber 100, which is to be mounted on a vehicle, will be described. The hydraulic shock absorber 100 is a device that suppresses vibration of a vehicle body by, for example, being interposed between the vehicle body and an axle shaft of the vehicle and by generating a damping force.

Figure 1:
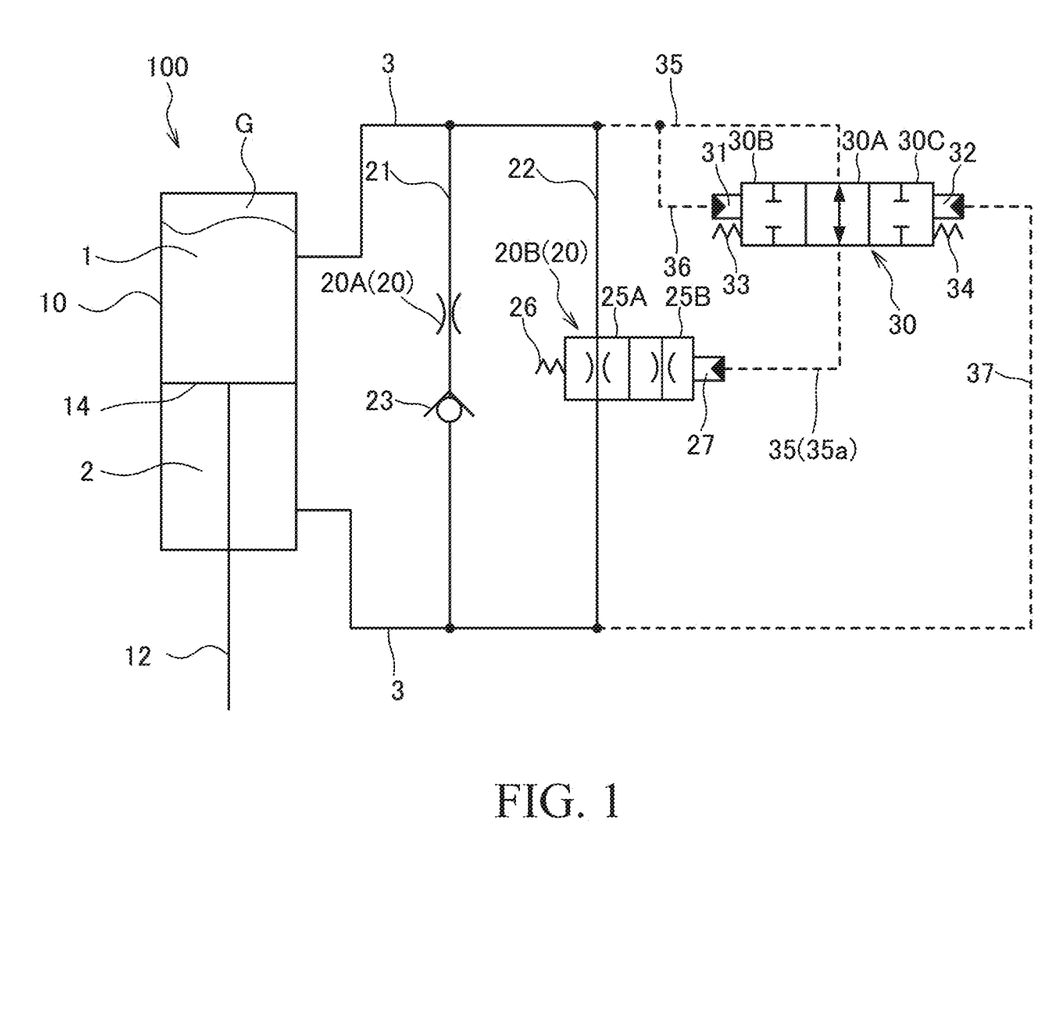
FIG. 1 is a fluid pressure circuit diagram of a fluid pressure shock absorber according to an embodiment of the present invention.

As shown in FIG. 1, the hydraulic shock absorber 100 includes a tubular cylinder tube 10, a rod 12 that is inserted into the cylinder tube 10 so as to be movable back and forth and that extends outside the cylinder tube 10, and a piston 14 that is connected to a tip end of the rod 12 and that is slidably moved along an inner circumferential surface of the cylinder tube 10. The hydraulic shock absorber 100 is installed on the vehicle in an orientation at which the cylinder tube 10 is positioned at the upper side and the rod 12 is positioned at the lower side.

An interior of the cylinder tube 10 is divided by the piston 14 into a bottom-side chamber 1 and a rod-side chamber 2. The bottom-side chamber 1 and the rod-side chamber 2 are respectively filled with working oil serving as working fluid. In the bottom-side chamber 1, pressurized gas G for exhibiting a spring effect by compensating for a volume change in the cylinder tube 10 due to inward and outward movement of the rod 12 relative to the cylinder tube 10 is sealed together with the working oil. As described above, the hydraulic shock absorber 100 has a function of an air-suspension that is capable of supporting the vehicle body by the spring effect exerted by the gas G. In this case, even if a spring for supporting the vehicle body is not provided separately, it is possible to achieve generation of the damping force and support of the vehicle body by the hydraulic shock absorber 100.

Note that, the configuration is not limited to those described above, and the gas may not be sealed in the cylinder tube 10. In addition, it may be possible to provide a free piston that is movably provided inside the bottom-side chamber 1 and that divides the bottom-side chamber 1 into a liquid chamber, into which the working oil is sealed, and a gas chamber, into which the gas G is sealed. In addition, an accumulator connected to the bottom-side chamber 1 may be provided outside the cylinder tube 10, and the gas chamber may be provided in the accumulator.

The bottom-side chamber 1 is connected to the rod-side chamber 2 through a flow path 3. The hydraulic shock absorber 100 includes a damping valve 20 that is provided in the flow path 3 and that generates the damping force by imparting resistance to a flow of the working oil between the rod-side chamber 2 and the bottom-side chamber 1.

The flow path 3 is formed by being branched at an intermediate position, and has a first flow path 21 and a second flow path 22 that are parallel with each other. The damping valve 20 has a first damping valve 20A that is provided in the first flow path 21 and that imparts resistance to the flow of the working oil, and a second damping valve 20B that is provided in the second flow path 22 and that imparts resistance to the flow of the working oil. The first damping valve 20A and the second damping valve 20B are provided in parallel with each other.

The first flow path 21 includes a check valve 23 that only allows the flow of the working oil from the bottom-side chamber 1 to the rod-side chamber 2. Therefore, the first damping valve 20A imparts the resistance only to the flow of the working oil directed from the bottom-side chamber 1 towards the rod-side chamber 2. In this embodiment, the first damping valve 20A is, for example, a fixed orifice.

The second damping valve 20B imparts the resistance to the flow of the working oil between the bottom-side chamber 1 and the rod-side chamber 2 in both directions. The position of the second damping valve 20B is switched in response to a pilot pressure, and the resistances imparted to the flows of the working oil passing therethrough are different at respective positions. In other words, the damping characteristic of the second damping valve 20B can be changed in response to the pilot pressure.

In this embodiment, the second damping valve 20B has two positions, i.e., a first restricting position 25A, at which a predetermined resistance is imparted to the flow of the working oil passing therethrough, and a second restricting position 25B, at which the resistance of a different magnitude is imparted compared to the resistance imparted at the first restricting position 25A. In other words, the first restricting position 25A and the second restricting position 25B have different pressure loss characteristics for the flow of the working oil passing therethrough.

The second damping valve 20B has a valve body (not shown) that switches the position, a spring 26 serving as a biasing member that biases the valve body, and a pilot chamber 27 to which the pilot pressure is supplied. In the second damping valve 20B, the valve body is biased by the spring 26 such that the second damping valve 20B is positioned at the first restricting position 25A. In the second damping valve 20B, by the pilot pressure guided to the pilot chamber 27, the valve body is moved against the biasing force exerted by the spring 26, and thereby, the second damping valve 20B is switched to the second restricting position 25B.

When the hydraulic shock absorber 100 is contracted, the pressure in the bottom-side chamber 1 is increased, and a part of the working oil in the bottom-side chamber 1 opens the check valve 23 and is guided to the rod-side chamber 2 by passing through the first damping valve 20A, while the rest of the working oil is guided to the rod-side chamber 2 by passing through the second damping valve 20B. As described above, when the hydraulic shock absorber 100 is contracted, the working oil in the bottom-side chamber 1 is guided to the rod-side chamber 2 by passing through both of the first damping valve 20A and the second damping valve 20B. Therefore, when the hydraulic shock absorber 100 is contracted, the hydraulic shock absorber 100 generates the damping force corresponding to the overall flow path resistance exerted by the first damping valve 20A and the second damping valve 20B.

When the hydraulic shock absorber 100 is extended, the pressure in the rod-side chamber 2 is increased, and the working oil in the rod-side chamber 2 is guided to the bottom-side chamber 1 by passing through the second damping valve 20B. On the other hand, because the check valve 23 is closed by the increase in the pressure in the rod-side chamber 2, the working oil in the rod-side chamber 2 is not guided to the bottom-side chamber 1 through the first damping valve 20A. Thus, when the hydraulic shock absorber 100 is extended, the hydraulic shock absorber 100 generates the damping force corresponding to the flow path resistance exerted by the second damping valve 20B. Therefore, when the hydraulic shock absorber 100 is contracted, because the flow of the working oil from the bottom-side chamber 1 to the rod-side chamber 2 through the first damping valve 20A is allowed, the hydraulic shock absorber 100 generates a larger damping force during the extension than during the contraction correspondingly. As a result, in a case in which the vehicle drives over a bump on a road surface, the hydraulic shock absorber 100 is contracted in a relatively smoothly, and thereafter, the hydraulic shock absorber 100 generates the larger damping force during extension, thereby effectively damping the vibration exerted from the road surface to the vehicle body.

Note that, the first flow path 21, the first damping valve 20A, and the check valve 23 are not essential configurations, and a configuration in which the damping force is generated only by the second damping valve 20B may also be employed.

The hydraulic shock absorber 100 includes a pilot valve 30 that supplies the working oil in the bottom-side chamber 1 to the pilot chamber 27 of the second damping valve 20B as the pilot pressure. The pilot valve 30 is provided in a pilot passage 35. The pilot passage 35 is provided by being branched from the flow path 3 and connects the bottom-side chamber 1 and the pilot chamber 27 of the second damping valve 20B. The pilot passage 35 need only be configured to guide the working oil in the bottom-side chamber 1 to the pilot chamber 27 of the second damping valve 20B as the pilot pressure, and may, for example, be directly connected to the bottom-side chamber 1.

Here, in a large-sized vehicle such as a damp truck, because the hydraulic shock absorber 100 to be mounted has a large size, the flow rate of the working oil passing through the damping valve 20 is large. In addition, in the vehicle such as the damp truck having a large maximum load capacity, because the overall weight of the vehicle is large, the pressure of the working oil in the hydraulic shock absorber 100 supporting the weight thereof is high. Furthermore, in the hydraulic shock absorber 100, because the gas G is sealed in the cylinder tube 10 and the hydraulic shock absorber 100 also has the function of the air-suspension, the pressure of the working oil in the cylinder tube 10 becomes high. As described above, in a case in which the hydraulic shock absorber 100 is mounted on the large-sized vehicle, such as the damp truck, the working oil having a high pressure and a large flow rate flows through the damping valve 20. In contrast, a pilot fluid supplied to the pilot chamber 27 of the second damping valve 20B does not need to have the high pressure and the large flow rate, and so, the pilot passage 35 is formed to have a flow path diameter that is smaller than that of the flow path 3.

In this embodiment, the working oil in the bottom-side chamber 1 is used as the pilot pressure for switching the position of the second damping valve 20B. Instead, the working oil in the rod-side chamber 2 may also be used as the pilot pressure for switching the position of the second damping valve 20B. However, while the vehicle is travelling, when the wheel lands on a bottom of a depression in the road surface or when the wheel rides over the bump on the road surface, the hydraulic shock absorber 100 is contracted suddenly and temporarily, and thus, the pressure in the rod-side chamber 2 may become negative pressure. In contrast, the bottom-side chamber 1 supports the weight of the vehicle body, and the pressurized gas G is sealed in the bottom-side chamber 1, and thus, the pressure in the bottom-side chamber 1 does not become negative pressure during the operation of the hydraulic shock absorber 100. Therefore, it is preferable to use the working oil in the bottom-side chamber 1 as the pilot pressure.

The pilot valve 30 has three positions, i.e., a supply position 30A, at which the pilot pressure is supplied, a first shut-off position 30B, at which the supply of the pilot pressure is shut off, and a second shut-off position 30C, at which the supply of the pilot pressure is shut off.

The pilot valve 30 is a pilot-driven valve that can switch its position by the pilot pressure. The pilot valve 30 has: a spool valve (not shown) serving as the valve body that switches the position; a first pilot chamber 31 to which the working oil is guided from the bottom-side chamber 1 through a first pilot passage 36; a second pilot chamber 32 that is provided so as to oppose to the first pilot chamber 31 with the valve body interposed therebetween and to which the working oil is guided from the rod-side chamber 2 through a second pilot passage 37; a first spring 33 serving as a first biasing member that biases the valve body in the same direction as the pilot pressure in the first pilot chamber 31; and a second spring 34 serving as a second biasing member that biases the valve body in the same direction as the pilot pressure in the second pilot chamber 32.

The pressure receiving area of the spool valve on which the pilot pressure in the first pilot chamber 31 acts and the pressure receiving area of the spool valve on which the pilot pressure in the second pilot chamber 32 acts are equivalent. In addition, the biasing force exerted by the first spring 33 and the biasing force exerted the second spring 34 are also equivalent. When the pilot pressure in the first pilot chamber 31 and the pilot pressure in the second pilot chamber 32 become equivalent, the pilot valve 30 is positioned at the supply position 30A. In addition, when the pilot pressure in the first pilot chamber 31 becomes higher than the pilot pressure in the second pilot chamber 32, and as the spool valve is moved against the biasing force exerted by the second spring 34, the pilot valve 30 is switched to a first shut-off position 30B. In addition, when the pilot pressure in the second pilot chamber 32 becomes higher than the pilot pressure in the first pilot chamber 31, and as the spool valve is moved against the biasing force exerted by the first spring 33, the pilot valve 30 is switched to a second shut-off position 30C.

In FIG. 1, the first pilot passage 36 is provided by being branched from the pilot passage 35. However, the first pilot passage 36 need only be configured to guide the working oil in the bottom-side chamber 1 to the first pilot chamber 31 of the pilot valve 30 as the pilot pressure, and may be provided by being branched from the flow path 3 or may be directly connected to the bottom-side chamber 1, for example.

In FIG. 1, the second pilot passage 37 is provided by being branched from the flow path 3. However, the second pilot passage 37 need only be configured to guide the working oil in the rod-side chamber 2 to the second pilot chamber 32 of the pilot valve 30 as the pilot pressure, and may, for example, be directly connected to the rod-side chamber 2.

Here, with the vehicle such as the damp truck having a large maximum load capacity, because the overall weight of the vehicle, including the load, varies significantly between an empty state with no load and a loaded state in which the load has a predetermined weight, the energy to be damped by the hydraulic shock absorber 100 also varies significantly. Thus, in this embodiment, the damping characteristic of the second damping valve 20B is changed by the pilot valve 30 according to the load weight of the vehicle. Details will be described below.

Figure 2:
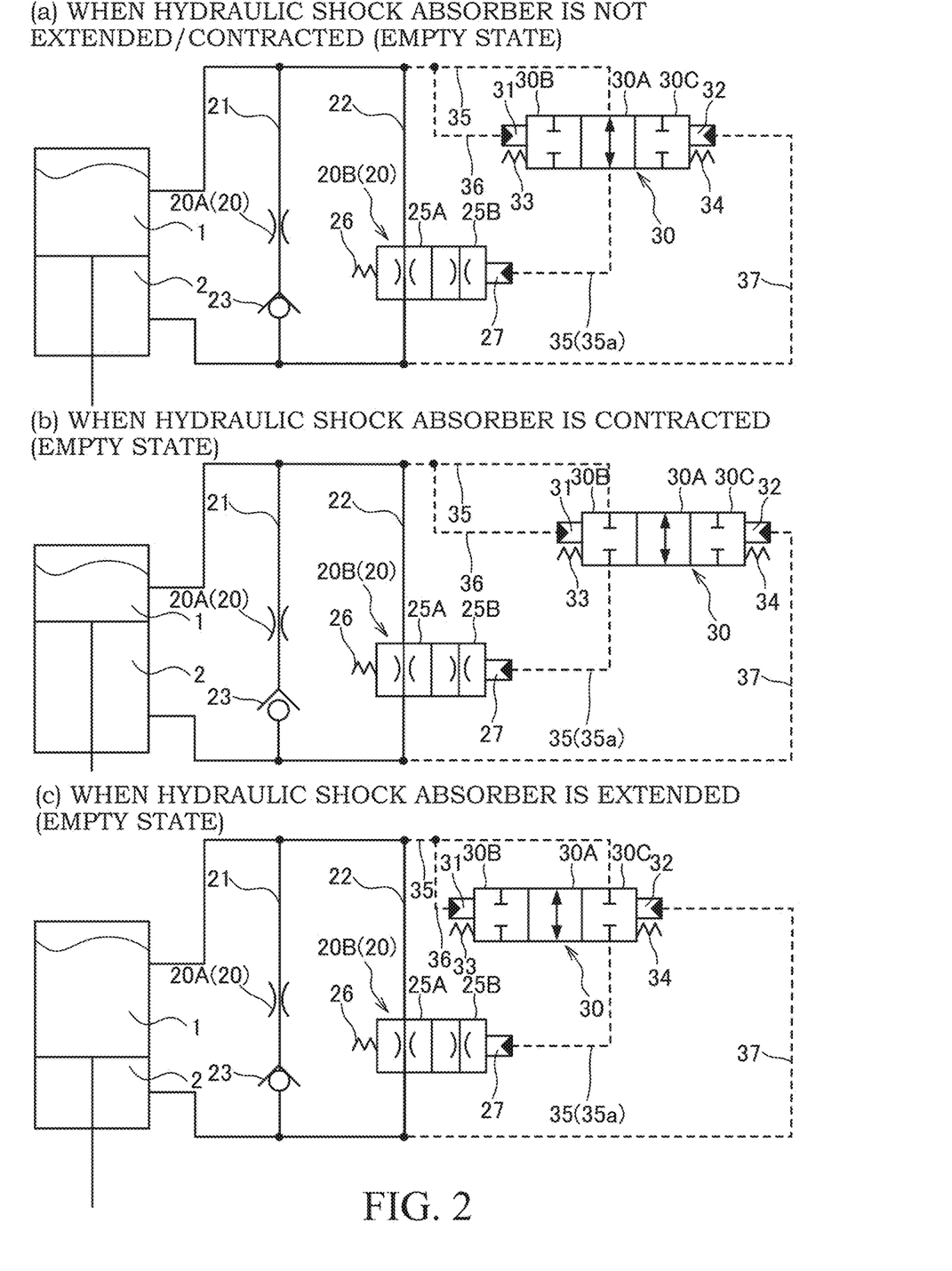
FIG. 2 is a diagram for explaining the operation of the fluid pressure shock absorber in an empty state.
Figure 3:
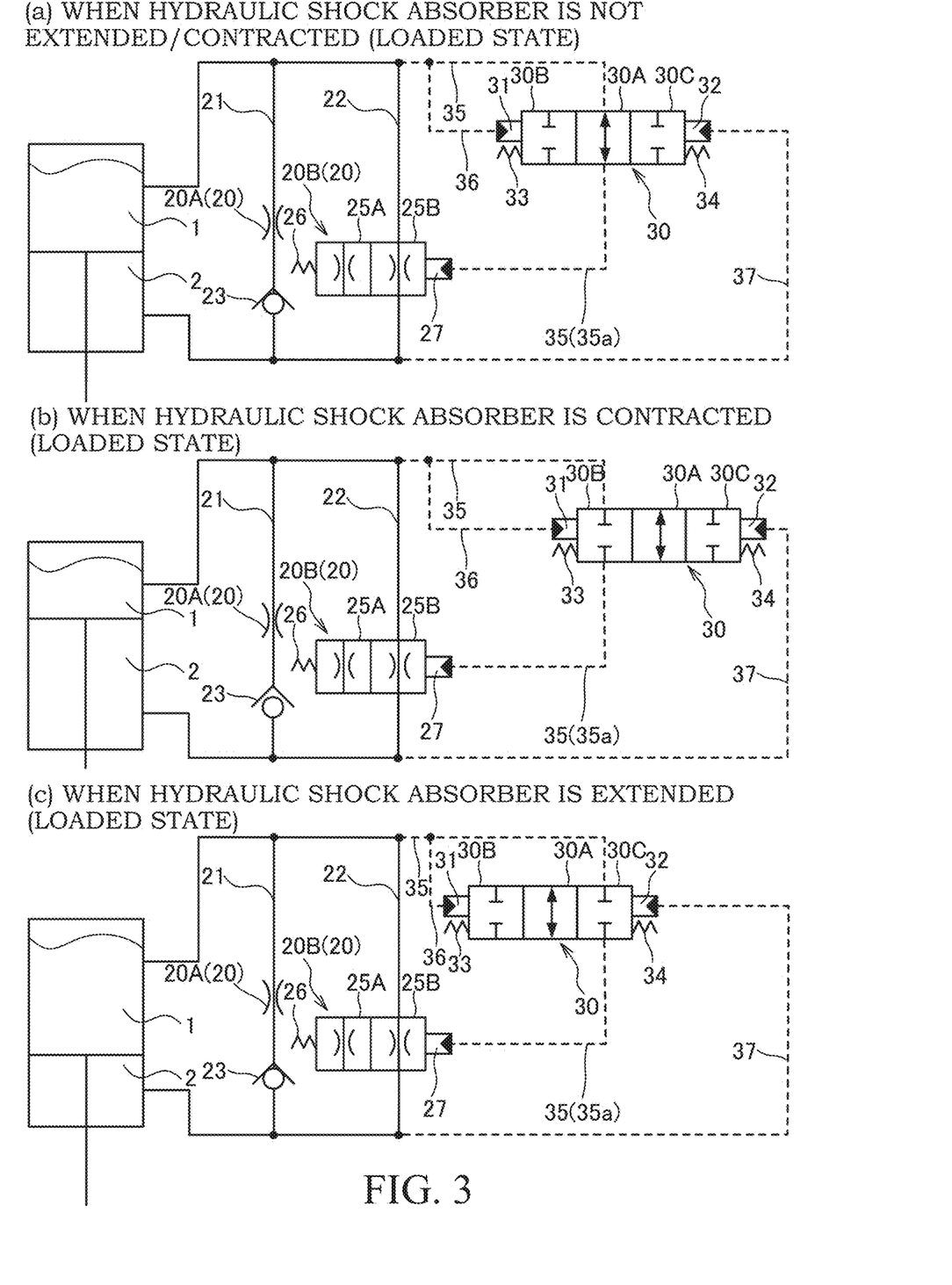
FIG. 3 is a diagram for explaining the operation of the fluid pressure shock absorber in a loaded state.

FIG. 2 is a diagram for explaining the operation of the hydraulic shock absorber 100 in the empty state, and FIG. 3 is a diagram for explaining the operation of the hydraulic shock absorber 100 in the loaded state. In FIGS. 2 and 3, (a) each shows a situation when the hydraulic shock absorber 100 is not extended/contracted, (b) each shows a situation when the hydraulic shock absorber 100 is contracted, and (c) each shows a situation when the hydraulic shock absorber 100 is extended.

The operation of the hydraulic shock absorber 100 in the empty state will be described first with reference to FIG. 2. In the empty state, because the overall weight of the vehicle is small, the internal pressure of the hydraulic shock absorber 100 is low. In addition, when the vehicle is in a stop state and the hydraulic shock absorber 100 is not extended/contracted, or even if the vehicle is travelling, when the travelling road surface is flat and the hydraulic shock absorber 100 is not extended/contracted, because there is no flow of the working oil between the bottom-side chamber 1 and the rod-side chamber 2, the pressure in the bottom-side chamber 1 and the pressure in the rod-side chamber 2 become the same. As described above, when the vehicle is in the empty state and the hydraulic shock absorber 100 is not extended/contracted, the pressure in the bottom-side chamber 1 and the pressure in the rod-side chamber 2 become low at the same pressure. As described above, as shown in FIG. 2(a), because the pilot pressure in the first pilot chamber 31 and the pilot pressure in the second pilot chamber 32 become the same, the pilot valve 30 is positioned at the supply position 30A, and the working oil in the bottom-side chamber 1 is supplied to the pilot chamber 27 of the second damping valve 20B as the pilot pressure. At this time, because the pressure of the working oil in the bottom-side chamber 1 is low, the second damping valve 20B is positioned at the first restricting position 25A by the biasing force exerted by the spring 26. As described above, when the vehicle is in the empty state and the hydraulic shock absorber 100 is not extended/contracted, the low pilot pressure is supplied to the pilot chamber 27 of the second damping valve 20B, and the second damping valve 20B is positioned at the first restricting position 25A. In other words, when the vehicle is in the empty state and the hydraulic shock absorber 100 is not extended/contracted, the biasing force exerted by the spring 26 is set such that the biasing force exerted by the spring 26 is greater than the load exerted by the pilot pressure of the pilot chamber 27.

As shown in FIG. 2(b), when the hydraulic shock absorber 100 is contracted, because the pressure in the bottom-side chamber 1 becomes relatively high and the pressure in the rod-side chamber 2 becomes relatively low, the pilot pressure in the first pilot chamber 31 becomes higher than the pilot pressure in the second pilot chamber 32, and the spool valve is moved against the biasing force exerted by the second spring 34, and so, the pilot valve 30 is switched to the first shut-off position 30B. As described above, the supply of the high pilot pressure from the bottom-side chamber 1 to the pilot chamber 27 of the second damping valve 20B is shut off. At this time, because a downstream portion 35*a* of the pilot passage 35 on the downstream side of the pilot valve 30 between the pilot valve 30 and the pilot chamber 27 of the second damping valve 20B is closed, the pilot chamber 27 is held at the low pilot pressure supplied when the hydraulic shock absorber 100 is not extended/contracted. As described above, the second damping valve 20B is held at the first restricting position 25A.

As shown in FIG. 2(*c*), when the hydraulic shock absorber 100 is extended, because the pressure in the bottom-side chamber 1 becomes relatively low, and the pressure in the rod-side chamber 2 becomes relatively high, the pilot pressure in the second pilot chamber 32 becomes higher than the pilot pressure in the first pilot chamber 31, and the spool valve is moved against the biasing force exerted by the first spring 33, and so, the pilot valve 30 is switched to the second shut-off position 30C. As described above, the supply of the low pilot pressure from the bottom-side chamber 1 to the pilot chamber 27 of the second damping valve 20B is shut off. At this time, because the downstream portion 35*a* of the pilot passage 35 on the downstream side of the pilot valve 30 is closed, the pilot chamber 27 is held at the low pilot pressure supplied when the hydraulic shock absorber 100 is not extended/contracted. As described above, the second damping valve 20B is held at the first restricting position 25A.

Next, the operation of the hydraulic shock absorber 100 in the loaded state will be described with reference to FIG. 3. In the loaded state, because the overall weight of the vehicle is larger, the internal pressure of the hydraulic shock absorber 100 is higher, and so, the pressure in the bottom-side chamber 1 and the pressure in the rod-side chamber 2 become medium pressure that is relatively high compared with those in the empty state. In addition, when the vehicle is in the stop state and the hydraulic shock absorber 100 is not extended/contracted, or even if the vehicle is travelling, when the travelling road surface is flat and the hydraulic shock absorber 100 is not extended/contracted, because there is no flow of the working oil between the bottom-side chamber 1 and the rod-side chamber 2, the pressure in the bottom-side chamber 1 and the pressure in the rod-side chamber 2 become the same. As described above, when the vehicle is in the loaded state and the hydraulic shock absorber 100 is not extended/contracted, the pressure in the bottom-side chamber 1 and the pressure in the rod-side chamber 2 become medium at the same pressure. As described above, as shown in FIG. 3(*a*), because the pilot pressure in the first pilot chamber 31 and the pilot pressure in the second pilot chamber 32 become the same, the pilot valve 30 is positioned at the supply position 30A, and the working oil in the bottom-side chamber 1 is supplied to the pilot chamber 27 of the second damping valve 20B as the pilot pressure. At this time, because the working oil in the bottom-side chamber 1 is at medium pressure, the valve body is moved by the pilot pressure in the pilot chamber 27 against the biasing force exerted by the spring 26, and so, the second damping valve 20B is switched to the second restricting position 25B. As described above, when the vehicle is in the loaded state and the hydraulic shock absorber 100 is not extended/contracted, the medium pilot pressure is supplied to the pilot chamber 27 of the second damping valve 20B, and the second damping valve 20B is positioned at the second restricting position 25B. In other words, when the vehicle is in the loaded state and the hydraulic shock absorber 100 is not extended/contracted, the biasing force exerted by the spring 26 is set such that the load exerted by the pilot pressure of the pilot chamber 27 becomes greater than the biasing force exerted by the spring 26. In other words, the timing at which the second damping valve 20B is switched from the first restricting position 25A to the second restricting position 25B is determined by the biasing force exerted by the spring 26. It is preferable that the switching timing of the second damping valve 20B can be adjusted in accordance with the individual differences of the vehicle and the types of the load. In such a case, the switching timing of the second damping valve 20B is adjusted by changing the initial load of the spring 26 by a nut, etc.

As shown in FIG. 3(*b*), when the hydraulic shock absorber 100 is contracted, because the pressure in the bottom-side chamber 1 becomes relatively high, and the pressure in the rod-side chamber 2 becomes relatively low, the pilot pressure in the first pilot chamber 31 becomes higher than the pilot pressure in the second pilot chamber 32, and the spool valve is moved against the biasing force exerted by the second spring 34, and so, the pilot valve 30 is switched to the first shut-off position 30B. As described above, the supply of the high pilot pressure from the bottom-side chamber 1 to the pilot chamber 27 of the second damping valve 20B is shut off. At this time, because the downstream portion 35*a* of the pilot passage 35 on the downstream side of the pilot valve 30 is closed, the pilot chamber 27 is held at the medium pilot pressure supplied when the hydraulic shock absorber 100 is not extended/contracted. As described above, the second damping valve 20B is held at the second restricting position 25B.

As shown in FIG. 3(*c*), when the hydraulic shock absorber 100 is extended, because the pressure in the bottom-side chamber 1 becomes relatively high and the pressure in the rod-side chamber 2 becomes relatively high, the pilot pressure in the second pilot chamber 32 becomes higher than the pilot pressure in the first pilot chamber 31, and the spool valve is moved against the biasing force exerted by the first spring 33, and so, the pilot valve 30 is switched to the second shut-off position 30C. As described above, the supply of the low pilot pressure from the bottom-side chamber 1 to the pilot chamber 27 of the second damping valve 20B is shut off. At this time, because the downstream portion 35*a* of the pilot passage 35 on the downstream side of the pilot valve 30 is closed, the pilot chamber 27 is held at the medium pilot pressure supplied when the hydraulic shock absorber 100 is not extended/contracted. As described above, the second damping valve 20B is held at the second restricting position 25B.

The pilot pressure in the pilot chamber 27 of the second damping valve 20B in the loaded state is the medium pressure. This medium pressure is lower than the pressure on the high pressure side of the bottom-side chamber 1 and the rod-side chamber 2 and higher than the pressure on the low pressure side of the bottom-side chamber 1 and the rod-side chamber 2 during the extension and contraction operation of the hydraulic absorber 100 in the empty state and the loaded state.

As described above, when the hydraulic shock absorber 100 is not extended/contracted, the pilot valve 30 supplies the working oil in the bottom-side chamber 1 to the pilot chamber 27 of the second damping valve 20B as the pilot pressure, and when the hydraulic shock absorber 100 is extended/contracted, the pilot valve 30 holds the pilot pressure in the pilot chamber 27 supplied when the hydraulic shock absorber 100 is not extended/contracted. As described above, the pilot pressure in the pilot chamber 27 of the second damping valve 20B becomes the pressure in the bottom-side chamber 1 when the hydraulic shock absorber 100 is not extended/contracted. In other words, the pilot pressure in the pilot chamber 27 of the second damping valve 20B is determined according to the load weight of the vehicle. Specifically, when the load weight is less than a predetermined weight, the pilot pressure in the pilot chamber 27 of the second damping valve 20B becomes low, and so, the second damping valve 20B is positioned at the first restricting position 25A, and when the load weight is equal to or greater than a predetermined weight, the pilot pressure in the pilot chamber 27 of the second damping valve 20B becomes the medium pressure, and so, the second damping valve 20B is positioned at the second restricting position 25B. Therefore, the hydraulic shock absorber 100 can exhibit an optimal damping characteristic according to the load weight of the vehicle.

Figure 4:
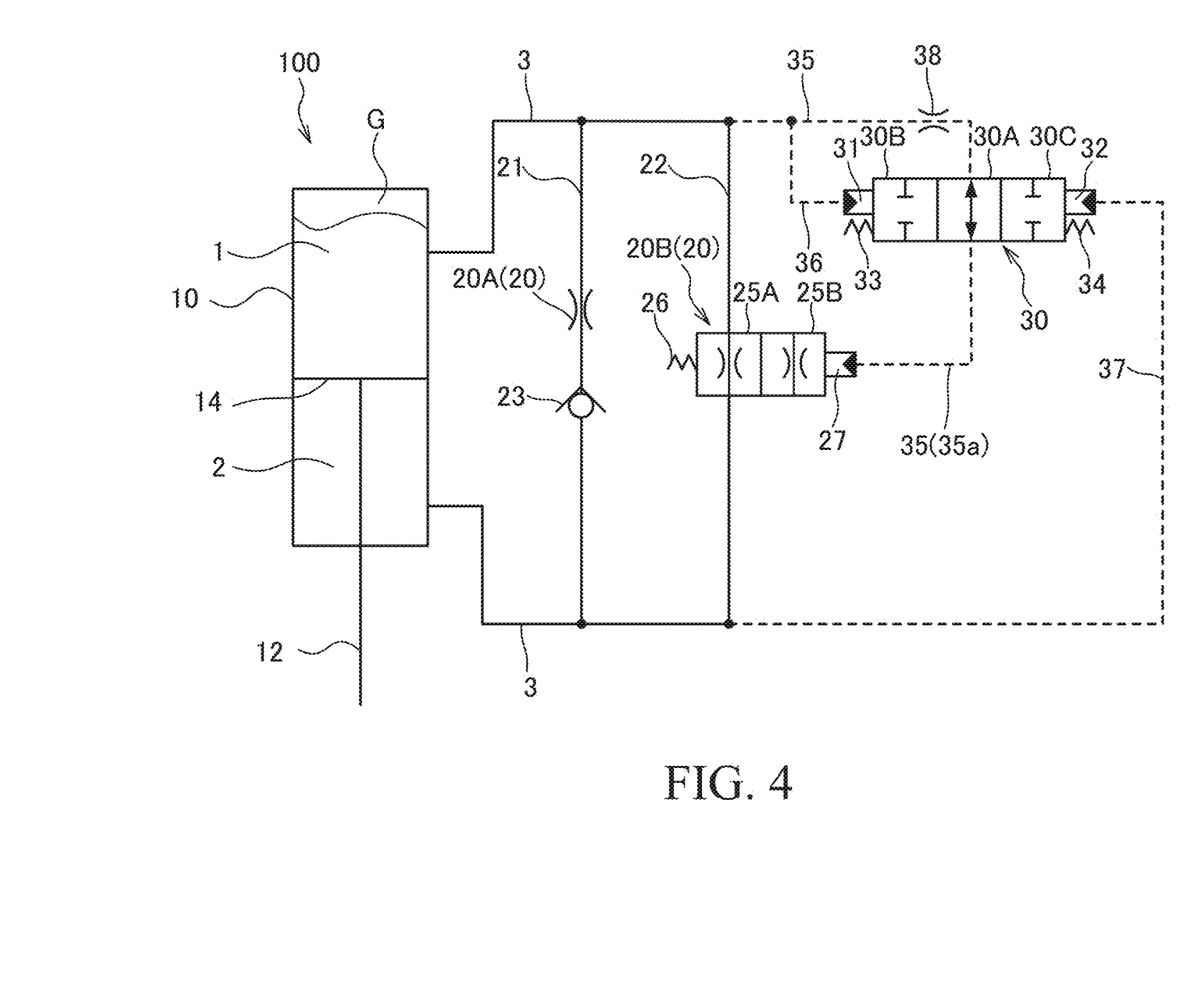
FIG. 4 is a fluid pressure circuit diagram of the fluid pressure shock absorber according to a modification of the embodiment of the present invention.

During the extension/contraction of the hydraulic shock absorber 100, the pressure level in the bottom-side chamber 1 and the rod-side chamber 2 of the hydraulic shock absorber 100 is switched every time expansion/contraction is performed, and thus, at the moment of the switching, the pressure in the bottom-side chamber 1 and the pressure in the rod-side chamber 2 become the same instantaneously. At this time, in order to prevent the pressure in the bottom-side chamber 1 from being guided to the pilot chamber 27 of the second damping valve 20B through the pilot valve 30, it is preferable to provide an orifice 38 serving as a restrictor in the pilot passage 35 as shown in FIG. 4. By providing the orifice 38, it becomes more difficult for the pressure in the bottom-side chamber 1 to be transmitted to the pilot chamber 27 of the second damping valve 20B via the pilot valve 30 during the extension/contraction of the hydraulic shock absorber 100, and so, it is possible to prevent the second damping valve 20B from being unintentionally switched during the extension/contraction of the hydraulic shock absorber 100. In FIG. 4, the orifice 38 is provided on the upstream side of the pilot valve 30 in the pilot passage 35. However, the orifice 38 may also be provided on the downstream side of the pilot valve 30 in the pilot passage 35.

Figure 5:
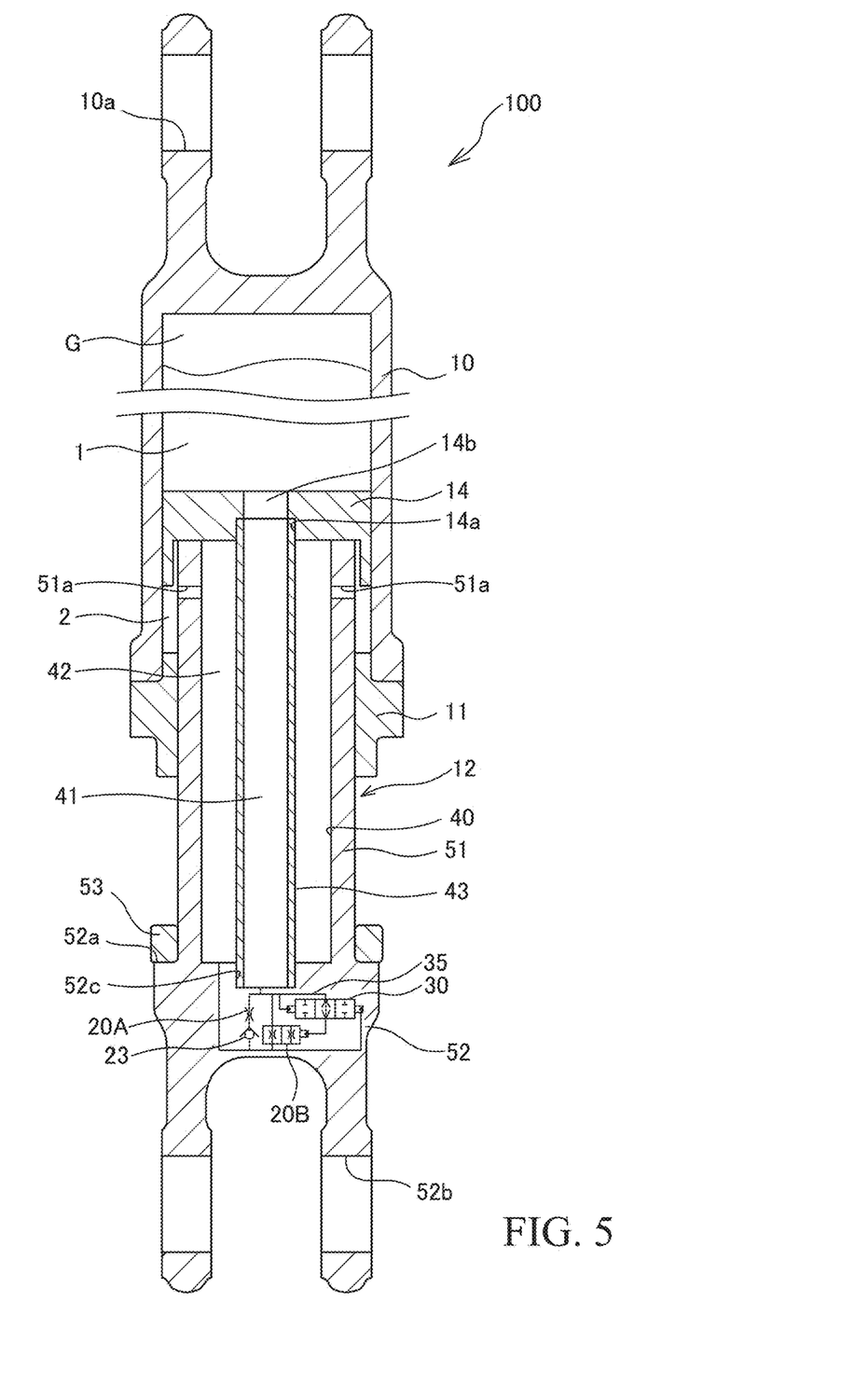
FIG. 5 is a sectional view of the fluid pressure shock absorber according to the embodiment of the present invention.

Next, with reference to FIG. 5, the structure of the hydraulic shock absorber 100, and an example of mounting the damping valve 20 and the pilot valve 30 on the hydraulic shock absorber 100 will be described. FIG. 5 is a sectional view of the hydraulic shock absorber 100.

The cylinder tube 10 has a bottomed cylindrical shape, and a cylinder head 11, through which the rod 12 is slidably inserted, is provided on its opening end. An attachment portion 10a for attaching the hydraulic shock absorber 100 to the vehicle is provided on a closing end of the cylinder tube 10 (the end portion on the opposite side from the cylinder head 11).

The rod 12 has a rod main body 51 that is connected to the piston 14 and that is slidably supported by the cylinder head 11 of the cylinder tube 10 and a head portion 52 that is exposed to the outside of the cylinder tube 10.

The rod main body 51 is formed with a rod inner space 40 that opens at an end surface on the piston 14 side. An end portion of the rod main body 51 is joined to the piston 14 by a bolt (not shown).

The head portion 52 is formed to have a diameter larger than that of the rod main body 51, and the head portion 52 is always exposed to the outside of the cylinder tube 10 regardless of the stroke position of the hydraulic shock absorber 100. In other words, the head portion 52 is a portion of the rod 12 that does not slide with respect to the cylinder head 11. The head portion 52 is, for example, formed separately from the rod main body 51, and is connected to the end portion of the rod main body 51 by welding, etc. The rod main body 51 and the head portion 52 may be formed integrally.

The head portion 52 includes a stopper portion 52a that defines the stroke end when the hydraulic shock absorber 100 is contracted and an attachment portion 52b for attaching the hydraulic shock absorber 100 to the vehicle. The stopper portion 52a includes an annular cushion ring 53 that prevents collision between the cylinder head 11 and the rod 12 at the stroke end when the hydraulic shock absorber 100 is contracted.

The rod inner space 40 includes a cylindrical pipe 43. The one end of the pipe 43 is inserted into an insertion hole 52c formed in the head portion 52 and the other end thereof is inserted into an insertion hole 14a formed in the piston 14. As described above, the pipe 43 is provided so as to be interposed between the head portion 52 and the piston 14.

By providing the pipe 43 in the rod inner space 40, the rod inner space 40 is divided into a first space 41 that is a hollow portion in the pipe 43 and an annular second space 42 that is partitioned between an outer circumferential surface of the pipe 43 and an inner circumferential surface of the rod main body 51. The first space 41 communicates with the bottom-side chamber 1 through a through hole 14b that is formed in the piston 14. The second space 42 communicates with the rod-side chamber 2 through a plurality of through holes 51a that are formed in the rod main body 51 of the rod 12. As described above, the rod inner space 40 has the first space 41 that communicates with the bottom-side chamber 1 and the second space 42 that communicates with the rod-side chamber 2. The first space 41 and the second space 42 each forms a part of the flow path 3 that connects the bottom-side chamber 1 with the rod-side chamber 2.

The flow path 3, the first damping valve 20A, the second damping valve 20B, and the pilot valve 30 are provided in the head portion 52 of the rod 12. The pilot passage 35, the first pilot passage 36, and the second pilot passage 37 are also provided in the head portion 52. The pilot pressure is guided to the pilot chamber 27 of the second damping valve 20B from the bottom-side chamber 1 via the first space 41 and the pilot passage 35. In addition, the pilot pressure is guided to the first pilot chamber 31 of the pilot valve 30 from the bottom-side chamber 1 via the first space 41 and the first pilot passage 36. In addition, the pilot pressure is guided to the second pilot chamber 32 of the pilot valve 30 from the rod-side chamber 2 via the second space 42 and the second pilot passage 37. As described above, in this configuration, each pilot pressure is guided through the rod inner space 40 and each of the pilot passages 35 to 37 provided in the head portion 52, and the pilot pressure is guided out from the vertically lower side with respect to the gas G that is stored on the vertically upper side of the hydraulic shock absorber 100. Therefore, because the gas G is prevented from being mixed with the pilot fluid, the operation of the second damping valve 20B and the pilot valve 30 is stabilized. As described above, even if the gas chamber, into which the gas G is to be sealed, is not divided by the free piston, it is possible to prevent the gas G from being mixed into the pilot fluid by guiding out the pilot pressure from the vertically lower side with respect to the gas G.

When the working oil in the rod-side chamber 2 is to be used as the pilot pressure for driving the second damping valve 20B, the pilot pressure may be guided to the pilot chamber 27 of the second damping valve 20B through the second space 42 and the pilot passages provided in the head portion 52.

According to the embodiment mentioned above, the advantages described below are afforded.

In the hydraulic shock absorber 100, the working oil in the bottom-side chamber 1 when the hydraulic shock absorber 100 is not extended/contracted is used as the pilot pressure to change the damping characteristic of the second damping valve 20B, and so, the damping characteristic suitable for the load weight is achieved. In addition, the pilot valve 30 that supplies the pilot pressure to the second damping valve 20B is operated by the working oil guided from the bottom-side chamber 1 and the working oil guided from the rod-side chamber 2. As described above, because the second damping valve 20B and the pilot valve 30 are the pilot-driven valves, electronic devices such as solenoids, etc. are not required. Thus, it is possible to realize the configuration in which the damping characteristic can be changed in accordance with the load weight at low cost.

In the following, modifications of the above-mentioned embodiment will be described. The modifications described below also fall within the scope of the present invention. It may also be possible to combine the following modifications with the configurations in the above-described embodiment, and it may also be possible to combine the following modifications with each other.

(1) By referring to FIGS. 2 and 3, a description has been given of the example in which the second damping valve 20B is positioned at the first restricting position 25A when the vehicle is in the empty state, and the second damping valve 20B is positioned at the second restricting position 25B when the vehicle is in the loaded state. However, the second damping valve 20B may be positioned at the first restricting position 25A when the load weight is less than a predetermined weight, and the second damping valve 20B may be positioned at the second restricting position 25B when the load weight is equal to or greater than a predetermined weight.

Figure 6:
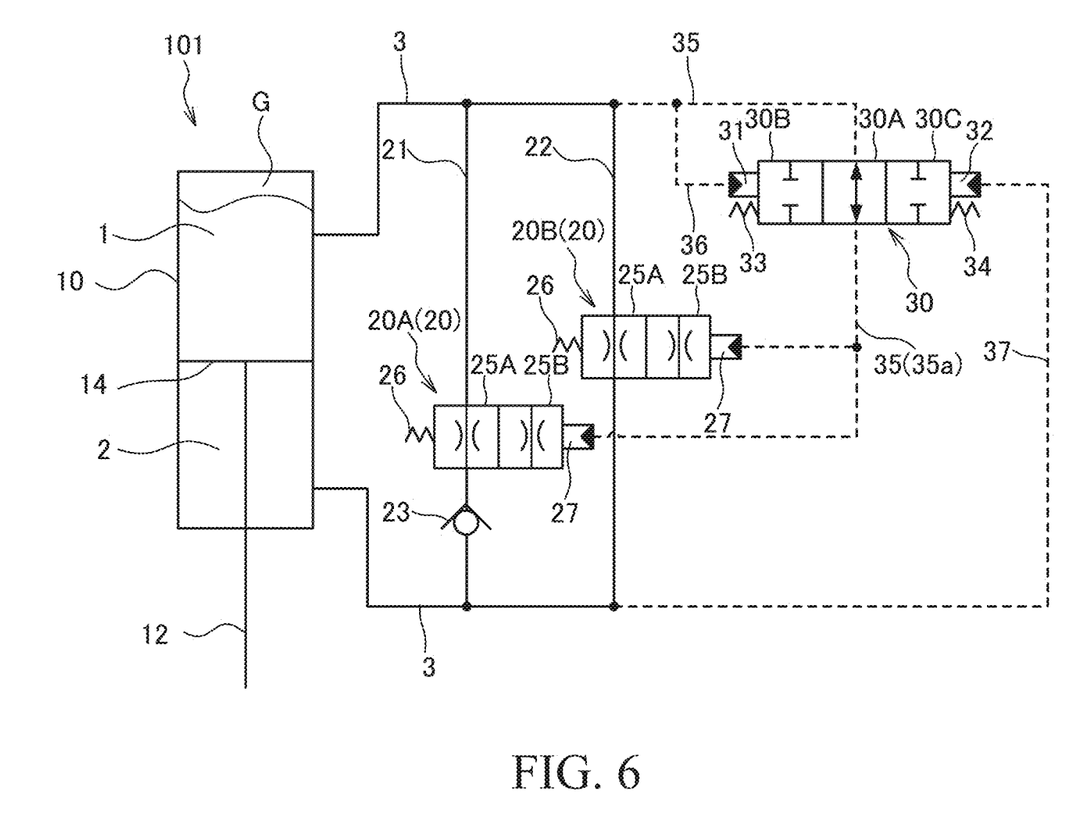
FIG. 6 is a fluid pressure circuit diagram of the fluid pressure shock absorber according to the modification of the embodiment of the present invention.

(2) In a hydraulic shock absorber 101 shown in FIG. 6, the damping characteristic can be changed in response to the pilot pressure also in the first damping valve 20A. In other words, the first damping valve 20A has the configuration that is the same as that of the second damping valve 20B of the hydraulic shock absorber 100 according to the above-mentioned embodiment. The pilot pressure is supplied from the pilot valve 30 to both of the first damping valve 20A and the second damping valve 20B. In this modification, it is possible to realize an optimal damping characteristic according to the load weight of the vehicle.

In the hydraulic shock absorber 101, the check valve 23 provided in the first flow path 21 may be provided in the reverse direction. In other words, the first damping valve 20A may be configured such that the resistance is imparted only to the flow of the working oil directed from the one of the bottom-side chamber 1 and the rod-side chamber 2 towards the other. Furthermore, the second flow path 22 in which the second damping valve 20B is provided may be provided with a check valve that only allows the flow of the working oil from the rod-side chamber 2 to the bottom-side chamber 1. In such a case, the second damping valve 20B imparts the resistance only to the flow of the working oil directed from the rod-side chamber 2 towards the bottom-side chamber 1.

Figure 7:
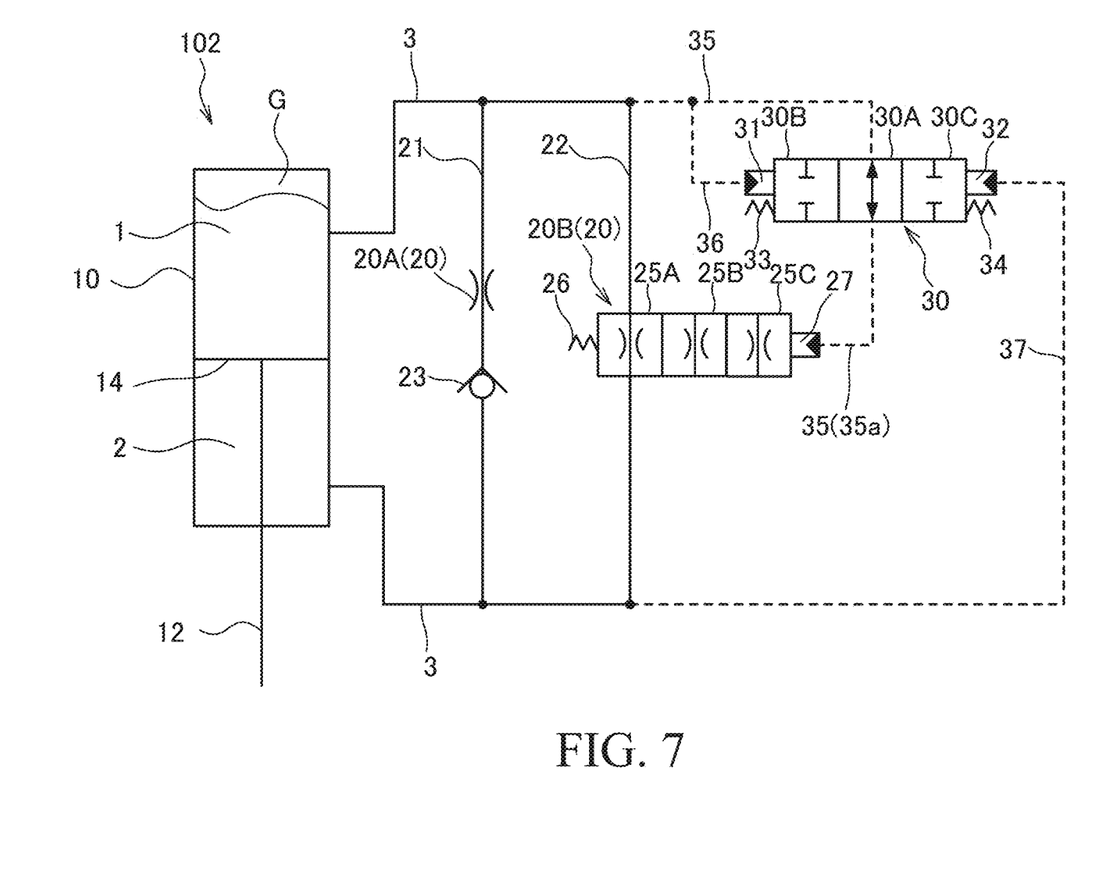
FIG. 7 is a fluid pressure circuit diagram of the fluid pressure shock absorber according to the modification of the embodiment of the present invention.

(3) In a hydraulic shock absorber 102 shown in FIG. 7, in addition to the first restricting position 25A and the second restricting position 25B, the second damping valve 20B has a third restricting position 25C that imparts the resistance of a different magnitude compared to the resistance imparted by the first restricting position 25A and the second restricting position 25B. In this case, in the second damping valve 20B, the damping characteristic is changed in three stages in response to the pilot pressure supplied to the pilot chamber 27 when the hydraulic shock absorber 100 is not extended/contracted. For example, the second damping valve 20B may be set to the first restricting position 25A, the second restricting position 25B, and the third restricting position 25C, respectively in the empty state, the loaded state in which the load weight is less than a predetermined weight, and the loaded state in which the load weight is equal to or greater than a predetermined weight. As described above, the second damping valve 20B may be configured such that the damping characteristic can be changed in three or more stages or continuously in response to the pilot pressure supplied to the pilot chamber 27 when the hydraulic shock absorber 100 is not extended/contracted. Even in this modification, it is possible to realize an optimal damping characteristic according to the load weight of the vehicle.

(4) In the above-mentioned embodiment, a description has been given of the configuration in which the hydraulic shock absorber 100 is mounted on the vehicle in the direction in which the cylinder tube 10 faces upward and the rod 12 faces downward. On the contrary, however, the hydraulic shock absorber 100 may be mounted on the vehicle in the direction in which the cylinder tube 10 faces downward and the rod 12 faces upward. In this case, in order to prevent upward movement of the gas G in the bottom-side chamber 1, it is required to provide, in the bottom-side chamber 1, a free piston that separates the liquid chamber in which the working oil is sealed and the gas chamber in which the gas is sealed. Alternatively, an accumulator connected to the bottom-side chamber 1 may be provided outside the cylinder tube 10, and a gas chamber may be provided in the accumulator.

(5) In the above-mentioned embodiment, although the hydraulic shock absorber 100 is of a single-rod type in which the tip end of the rod 12 projects out to the outside of the cylinder tube 10, the hydraulic shock absorber 100 may also be of a double rod type in which both ends of the rod 12 project out to the outside of the cylinder tube 10.

In the following, the configurations, operations, and effects of the respective embodiments of the present invention will be collectively described.

The hydraulic shock absorber 100 (the fluid pressure shock absorber) mounted on the vehicle includes: the cylinder tube 10; the rod 12 inserted into the cylinder tube 10 so as to be movable back and forth; the piston 14 connected to the rod 12 and dividing the interior of the cylinder tube 10 into the bottom-side chamber 1 and the rod-side chamber 2; the damping valve 20 configured to impart the resistance to the flow of the working oil (the working fluid) between the bottom-side chamber 1 and the rod-side chamber 2, the damping valve 20 being capable of changing the damping characteristic in response to the pilot pressure; and the pilot valve 30 configured to supply the working oil in the bottom-side chamber 1 or the rod-side chamber 2 to the pilot chamber 27 of the damping valve 20 as the pilot pressure, wherein the pilot valve 30 has: the first pilot chamber 31 to which the working oil is guided from the bottom-side chamber 1; and the second pilot chamber 32 provided so as to be opposed to the first pilot chamber 31, the second pilot chamber 32 being configured such that the working oil is guided from the rod-side chamber 2, when the hydraulic shock absorber 100 is not extended/contracted, the pilot valve 30 supplies the pilot pressure to the pilot chamber 27 of the damping valve 20, and when the hydraulic shock absorber 100 is extended/contracted, the pilot valve 30 holds the pilot pressure in the pilot chamber 27 of the damping valve 20 supplied when the hydraulic shock absorber 100 is not extended/contracted.

In addition, the pilot valve 30 has: the supply position 30A to which the pilot valve 30 is switched when the pressure in the first pilot chamber 31 and the pressure in the second pilot chamber 32 become the same when the hydraulic shock absorber 100 is not extended/contracted; the first shut-off position 30B to which the pilot valve 30 is switched when the pressure in the first pilot chamber 31 becomes high and the pressure in the second pilot chamber 32 becomes low when the hydraulic shock absorber 100 is extended/contracted; and the second shut-off position 30C to which the pilot valve 30 is switched when the pressure in the second pilot chamber 32 becomes high and the pressure in the first pilot chamber 31 becomes low when the hydraulic shock absorber 100 is extended/contracted.

With these configurations, the working oil in the bottom-side chamber 1 or the rod-side chamber 2 when the hydraulic shock absorber 100 is not extended/contracted is used as the pilot pressure to change the damping characteristic of the damping valve 20, and so, the damping characteristic suitable for the load weight is achieved. In addition, the pilot valve 30 that supplies the pilot pressure to the damping valve 20 is operated by the working oil guided from the bottom-side chamber 1 and the working oil guided from the rod-side chamber 2. Thus, it is possible to realize the configuration in which the damping characteristic can be changed in accordance with the load weight at low cost.

In addition, the hydraulic shock absorber 100 further includes: the pilot passage 35 provided with the pilot valve 30, the pilot passage 35 connecting the bottom-side chamber 1 or the rod-side chamber 2 with the pilot chamber 27 of the damping valve 20; and the orifice 38 (the restrictor) provided in the pilot passage 35, the orifice 38 (the restrictor) being configured to impart the resistance to the flow of the pilot fluid.

With this configuration, by providing the orifice 38, it becomes more difficult for the pressure in the bottom-side chamber 1 or the rod-side chamber 2 to be transmitted to the pilot chamber 27 of the damping valve 20 through the pilot valve 30 during the extension/contraction of the hydraulic shock absorber 100, and so, it is possible to prevent the damping valve 20 from being unintentionally switched.

In addition, the working oil in the bottom-side chamber 1 is used as the pilot pressure, and the pressurized gas G is sealed in the bottom-side chamber 1.

With this configuration, because the pressurized gas G is sealed in the bottom-side chamber 1, and the pressure in the bottom-side chamber 1 does not become negative pressure during the operation of the hydraulic shock absorber 100, it is possible to operate the damping valve 20 stably.

In addition, the hydraulic shock absorber 100 has, as the damping valve 20, the first damping valve 20A and the second damping valve 20B provided in parallel with each other, the first damping valve 20A and the second damping valve 20B being configured to impart the resistance to the flow of the working oil, and the first damping valve 20A imparts the resistance only to the flow of the working oil directed from the one of the bottom-side chamber 1 and the rod-side chamber 2 towards the other of the bottom-side chamber 1 and the rod-side chamber 2.

In addition, the damping valve 20 is capable of changing the damping characteristic in three or more stages or continuously in response to the pilot pressure supplied to the pilot chamber 27 when the hydraulic shock absorber 102 is not extended/contracted.

With these configurations, it is possible to realize an optimal damping characteristic according to the state of the vehicle.

In addition, the rod 12 has: the rod main body 51 connected to the piston 14, the rod main body 51 being slidably supported by the cylinder tube 10; the head portion 52 exposed to the outside of the cylinder tube 10; and the rod inner space 40 formed inside the rod main body 51, the rod inner space 40 has: the first space 41 communicating with the bottom-side chamber 1; and the second space 42 communicating with the rod-side chamber 2, the damping valve 20 and the pilot valve 30 are provided in the head portion 52, and the pilot pressure supplied to the pilot chamber 27 of the damping valve 20 is supplied through the first space 41 or the second space 42.

With this configuration, it is possible to prevent the gas from being mixed with the pilot fluid.

Embodiments of this invention were described above, but the above embodiments are merely examples of applications of this invention, and the technical scope of this invention is not limited to the specific constitutions of the above embodiments.

This application claims priority based on Japanese Patent Application No. 2022-35295 filed with the Japan Patent Office on Mar. 8, 2022, the entire contents of which are incorporated into this specification.

The invention claimed is:

1. A fluid pressure shock absorber mounted on a vehicle, comprising:
   a cylinder tube;
   a rod inserted into the cylinder tube so as to be movable back and forth;
   a piston connected to the rod and dividing an interior of the cylinder tube into a bottom-side chamber and a rod-side chamber;
   a damping valve configured to impart resistance to a flow of working fluid between the bottom-side chamber and the rod-side chamber, the damping valve being capable of changing damping characteristic in response to a pilot pressure; and
   a pilot valve configured to supply the working fluid in the bottom-side chamber or the rod-side chamber to a pilot chamber of the damping valve as a pilot pressure, wherein
   the pilot valve has:
   a first pilot chamber configured such that the working fluid is guided from the bottom-side chamber; and
   a second pilot chamber provided so as to be opposed to the first pilot chamber, the second pilot chamber being configured such that the working fluid is guided from the rod-side chamber,
   when the fluid pressure shock absorber is not extended or contracted, the pilot valve supplies the pilot pressure to the pilot chamber of the damping valve, and
   when the fluid pressure shock absorber is extended or contracted, the pilot valve holds the pilot pressure in the pilot chamber of the damping valve supplied when the fluid pressure shock absorber is not extended or contracted.

2. The fluid pressure shock absorber according to claim 1, wherein
the pilot valve has:
- a supply position to which the pilot valve is switched when pressure in the first pilot chamber and pressure in the second pilot chamber become same when the fluid pressure shock absorber is not extended or contracted;
- a first shut-off position to which the pilot valve is switched when the pressure in the first pilot chamber becomes high and the pressure in the second pilot chamber becomes low when the fluid pressure shock absorber is extended or contracted; and
- a second shut-off position to which the pilot valve is switched when the pressure in the second pilot chamber becomes high and the pressure in the first pilot chamber becomes low when the fluid pressure shock absorber is extended or contracted.

3. The fluid pressure shock absorber according to claim 1, further comprising:
- a pilot passage provided with the pilot valve, the pilot passage connecting the bottom-side chamber or the rod-side chamber with the pilot chamber of the damping valve; and
- a restrictor provided in the pilot passage, the restrictor being configured to impart resistance to a flow of a pilot fluid.

4. The fluid pressure shock absorber according to claim 1, wherein
the working fluid in the bottom-side chamber is used as the pilot pressure, and
a pressurized gas is sealed in the bottom-side chamber.

5. The fluid pressure shock absorber according to claim 1, wherein the damping valve comprises a first damping valve and a second damping valve provided in parallel with each other, the first damping valve and the second damping valve being configured to impart resistance to a flow of the working fluid, wherein
the first damping valve imparts the resistance only to a flow of the working fluid directed from one of the bottom-side chamber and the rod-side chamber towards the other of the bottom-side chamber and the rod-side chamber.

6. The fluid pressure shock absorber according to claim 1, wherein
the damping valve is configured to change damping characteristic in three or more stages or continuously in response to the pilot pressure supplied to the pilot chamber when the fluid pressure shock absorber is not extended or contracted.

7. The fluid pressure shock absorber according to claim 1, wherein
the rod has:
- a rod main body connected to the piston, the rod main body being slidably supported by the cylinder tube;
- a head portion exposed to outside of the cylinder tube; and
- a rod inner space formed inside the rod main body, the rod inner space has a first space communicating with the bottom-side chamber and a second space communicating with the rod-side chamber,
the damping valve and the pilot valve are provided in the head portion, and
the pilot pressure supplied to the pilot chamber of the damping valve is supplied through the first space or the second space.

* * * * *